United States Patent
Lee et al.

(10) Patent No.: US 10,142,053 B2
(45) Date of Patent: *Nov. 27, 2018

(54) METHOD AND APPARATUS FOR TRANSMITTING CONTROL INFORMATION TO REMOVE AND SUPPRESS INTERFERENCE IN WIRELESS COMMUNICATION SYSTEM

(71) Applicant: Samsung Electronics Co., Ltd., Suwon-si, Gyeonggi-do (KR)

(72) Inventors: Hyojin Lee, Suwon-si (KR); Youngbum Kim, Seoul (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,971

(22) Filed: Jul. 3, 2017

(65) Prior Publication Data
US 2017/0302404 A1    Oct. 19, 2017

Related U.S. Application Data

(63) Continuation of application No. 14/657,337, filed on Mar. 13, 2015, now Pat. No. 9,698,938.

(30) Foreign Application Priority Data

Mar. 14, 2014   (KR) .................. 10-2014-0030505

(51) Int. Cl.
*H04Q 7/00*   (2006.01)
*H04L 1/00*   (2006.01)
(Continued)

(52) U.S. Cl.
CPC .......... *H04L 1/0038* (2013.01); *H04J 11/005* (2013.01); *H04L 1/0045* (2013.01);
(Continued)

(58) Field of Classification Search
CPC ... H04L 1/0038; H04L 5/0073; H04L 5/0007; H04L 5/005; H04J 11/005
(Continued)

(56) References Cited

U.S. PATENT DOCUMENTS 9,094,145 B2   7/2015   Yue et al.
9,276,709 B2 *  3/2016   Mazzarese ............ H04L 5/0023
(Continued)

FOREIGN PATENT DOCUMENTS

KR   10-2014-0108785 A   9/2014
WO      2011/118993 A2   9/2011
WO      2014/035078 A1   3/2014

*Primary Examiner* — Chuong T Ho
(74) *Attorney, Agent, or Firm* — Jefferson IP Law, LLP

(57) ABSTRACT

A communication method and an apparatus for transferring interference-related control information in order to enhance reception performance of a user terminal that receives downlink signals in a cellular mobile communication system based on a long term evolution-advanced (LTE-A) system are provided. The method includes receiving transmission parameters of interference, which include information on a resource by which interference data is not transmitted, performing blind detection using the information on a resource by which interference data is not transmitted, performing error correction encoding using the transmission parameters of the interference and the blind detection result, and decoding the received data.

16 Claims, 11 Drawing Sheets

(51) Int. Cl.
  *H04L 5/00* (2006.01)
  *H04J 11/00* (2006.01)
(52) U.S. Cl.
  CPC ............ *H04L 5/005* (2013.01); *H04L 5/0007* (2013.01); *H04L 5/0073* (2013.01)
(58) Field of Classification Search
  USPC ................ 370/329, 330, 312, 252, 253, 254
  See application file for complete search history.

(56) References Cited

U.S. PATENT DOCUMENTS

| | | | |
|---|---|---|---|
| 9,398,480 | B2 | 7/2016 | Siomina |
| 9,503,216 | B2 | 11/2016 | Siomina et al. |
| 9,531,459 | B2 | 12/2016 | Harrison et al. |
| 9,544,112 | B2 | 1/2017 | Park et al. |
| 9,698,938 | B2 * | 7/2017 | Lee ........................ H04L 1/0038 |
| 2010/0157927 | A1 * | 6/2010 | Mochizuki ............ H04L 1/1685 370/329 |
| 2010/0309861 | A1 | 12/2010 | Gorokhov et al. |
| 2012/0087261 | A1 | 4/2012 | Yoo et al. |
| 2012/0113844 | A1 | 5/2012 | Krishnamurthy |
| 2012/0176939 | A1 * | 7/2012 | Qu ........................ H04L 5/0023 370/255 |
| 2012/0329400 | A1 | 12/2012 | Seo et al. |
| 2013/0114438 | A1 * | 5/2013 | Bhattad .................. H04J 11/005 370/252 |
| 2014/0126404 | A1 | 5/2014 | Kim et al. |
| 2014/0241273 | A1 | 8/2014 | Kim et al. |
| 2014/0254461 | A1 * | 9/2014 | Li ............................ H04L 1/004 370/312 |
| 2014/0301309 | A1 * | 10/2014 | Luo ........................ H04W 24/02 370/329 |
| 2014/0355469 | A1 | 12/2014 | Kang et al. |
| 2015/0078191 | A1 * | 3/2015 | Jongren ................ H04L 1/0026 370/252 |
| 2015/0110055 | A1 * | 4/2015 | Lv .......................... H04W 48/12 370/329 |
| 2015/0215920 | A1 * | 7/2015 | Mochizuki ............ H04L 1/1685 370/329 |
| 2016/0119936 | A1 * | 4/2016 | Kim ...................... H04J 11/0053 370/329 |

\* cited by examiner

METHOD AND APPARATUS FOR TRANSMITTING CONTROL INFORMATION TO REMOVE AND SUPPRESS INTERFERENCE IN WIRELESS COMMUNICATION SYSTEM

CROSS-REFERENCE TO RELATED APPLICATION(S)

This application is a continuation application of prior application Ser. No. 14/657,337, filed on Mar. 13, 2015, which claimed the benefit under 35 U.S.C. § 119(a) of a Korean patent application filed on Mar. 14, 2014 in the Korean Intellectual Property Office and assigned Serial number 10-2014-0030505, the entire disclosure of which is hereby incorporated by reference.

TECHNICAL FIELD

The present disclosure relates to a method and an apparatus for transferring interference-related control information in order to enhance reception performance of a user terminal that receives downlink signals in a cellular mobile communication system based on a long term evolution advanced (LTE-A) system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Mobile communication systems have been developed into high speed and high quality wireless packet data communication systems to provide data services and multimedia services as well as voice services that had been provided as initial services. Recently, various mobile communication standards, such as high speed downlink packet access (HSDPA), high speed uplink packet access (HSUPA), long term evolution (LTE), and LTE advanced (LTE-A) of the $3^{rd}$ Generation Partnership Project (3GPP), high rate packet data (HRPD) of 3GPP2, or the Institute of Electrical and Electronics Engineers (IEEE) 802.16, have been developed to support high speed and high quality wireless packet data transmission services. More particularly, an LTE system, which has been developed to effectively support high speed wireless packet data transmission, maximizes the capacity of a wireless system using various wireless connection technologies. An LTE-A system is an advanced system of the LTE system, and has a more enhanced data transmission ability compared with the LTE system.

The LTE generally means base stations and terminals corresponding to Release 8 or 9 in the 3GPP standardization organization, and the LTE-A denotes base stations and terminals corresponding to Release 10 in the 3GPP standardization organization. After standardization of the LTE-A system, the 3GPP standardization organization has proceeded with standardization of subsequent Releases, which have enhanced performance, based on the LTE-A system.

The current third and fourth generation wireless packet data communication systems, such as HSDPA, HSUPA, HRPD, LTE/LTE-A, or the like, utilize an adaptive modulation and coding (AMC) method and a channel sensitive scheduling method in order to improve transmission efficiency.

By using the AMC method, a transmitter may adjust the amount of data to be transmitted according to a channel state. For example, in a bad channel state, the amount of data to be transmitted is reduced to thereby adjust the receiving error probability to a desired degree, whereas, in a good channel state, the amount of data to be transmitted is increased to thereby adjust the receiving error probability to a desired degree and effectively transmit a lot of information. In using the channel sensitive scheduling resource management method, since a transmitter selectively provides services to user terminals that are in good channel states among a multitude of user terminals, the system capacity may increase compared to a method by which a channel is allotted to a single user for services. Such an increase in the capacity of the system is called multi-user diversity. In other words, according to the AMC method and the channel sensitive scheduling method, partial channel state information is fed back from a receiver and a proper modulating and encoding method is applied at the time when it is determined to be most efficient.

The AMC method may include a function of determining the number or the rank of spatial layers of transmission signals when it is used together with a multiple input multiple output (MIMO) transmission method. In this case, the AMC method may determine an optimum data rate by considering the number of layers by which data is transmitted using the MIMO method as well as by considering an encoding rate and a modulating method.

The MIMO system, which transmits wireless signals using a plurality of transmission antennas, may be divided into a single-user (SU)-MIMO system in which transmission is made to a single user terminal, and a multi-user (MU)-MIMO system in which transmission is made to a plurality of user terminals using the same time and frequency resources. In the case of the SU-MIMO system, a plurality of transmission antennas transmits wireless signals to a single receiver through a plurality of spatial layers. At this time, the receiver should have a plurality of reception antennas for supporting the plurality of spatial layers. On the contrary, in the case of the MU-MIMO system, a plurality of transmission antennas transmits wireless signals to a plurality of receivers through a plurality of spatial layers. The MU-MIMO system does not require a receiver that has a plurality of reception antennas, compared to the SU-MIMO system. However, since the MU-MIMO system transmits wireless signals to a plurality of receivers using the same frequency and time resources, interference may occur in wireless signals for different receivers.

Meanwhile, recently, conversion from code division multiple access (CDMA), which had been used in the second and the third mobile communication systems into orthogonal frequency division multiple access (OFDMA) used in the next generation mobile communication system has been widely researched. 3GPP and 3GPP2 began to proceed with standardization about an evolution system that uses OFDMA. It is known that the OFDMA system can increase the capacity compared to the CDMA system. One of the reasons why the OFDMA system comes with an increase in the capacity is frequency domain scheduling on the frequency axis. A capacity gain can be obtained through the channel sensitive scheduling method according to characteristics in which the channel varies with time. Likewise, further capacity gain can be obtained using characteristics in which the channel varies with frequency.

FIG. 1 illustrates time and frequency resources in LTE/LTE-A systems according to the related art.

Referring to FIG. 1, wireless resources transmitted from a base station, i.e., an evolved Node B (eNB), to a user terminal may be divided by a unit of resource blocks (RB) on the frequency axis and by a unit of subframes on the time axis, respectively. In general, the RB is comprised of twelve subcarriers and has a bandwidth of 180 kHz in the LTE/LTE-A systems. On the contrary, the subframe is comprised of fourteen OFDM symbol sections and has a time section of 1 msec in the LTE/LTE-A systems. In scheduling, the LTE/LTE-A systems may allot resources by a subframe unit on the time axis and by an RB unit on the frequency axis.

FIG. 2 illustrates a minimum wireless resource of one subframe and one RB for scheduling through downlink in LTE/LTE-A systems according to the related art.

Referring to FIG. 2, the wireless resource is comprised of one subframe on the time axis and one RB on the frequency axis, respectively. The wireless resource includes twelve subcarriers in a frequency area and fourteen OFDM symbols in a time area to thereby have 168 natural frequency and time regions in total. Each natural frequency and time region shown in FIG. 2 is referred to as a resource element (RE) in the LTE/LTE-A systems. In addition, one subframe is comprised of two slots that each have seven OFDM symbols.

The wireless resources of FIG. 2 may transmit a plurality of different signals as follows.
1. Cell specific reference signal (CRS): A reference signal that is transmitted to all of the user terminals included in one cell,
2. Demodulation reference signal (DMRS): A reference signal that is transmitted to a specific user terminal,
3. Physical downlink shared channel (PDSCH): A data channel that is transmitted through downlink using an RE by which a reference signal is not transmitted in the data region of FIG. 2, to allow a base station to transmit a traffic signal to a user terminal,
4. Channel status information reference signal (CSI-RS): A reference signal transmitted to user terminals included in one cell and used for measuring channel status. A plurality of CSI-RSs may be transmitted in one cell, and
5. Other control channels (physical hybrid automatic repeat-request (HARQ) indicator channel (PHICH), physical control format indicator channel (PCFICH), or physical downlink control channel (PDCCH)): These provide control information required for the user terminal to receive the PDSCH, or transmit acknowledge/negative-acknowledge (ACK/NACK) for managing HARQ for data transmission through uplink.

In addition to the signals above, a muting function may be configured so that the CSI-RSs transmitted from other base stations can be received by user terminals in a corresponding cell without interference in the LTE-A system. The muting function may be applied in the region where the CSI-RS can be transmitted, and generally, the user terminal receives a traffic signal while skipping the corresponding wireless resource to which the muting function is applied. In the LTE-A system, the muting may be called a zero-power CSI-RS as well. This is because the muting is applied to the region of the CSI-RS and transmission power is not transmitted due to the characteristics of the muting.

As shown in FIG. 2, the CSI-RS may be transmitted using some of the regions denoted by A, B, C, D, E, F, G, H, I, and J according to the number of antennas that transmit the CSI-RS. In addition, the muting may be applied to some of the regions denoted by A, B, C, D, E, F, G, H, I, and J. More particularly, the CSI-RSs may be transmitted by two, four, or eight REs according to the number of antenna ports that transmit the same. For example, in the case of two antenna ports, the CSI-RS may be transmitted using half a specific pattern, and in the case of four antenna ports, the CSI-RS may be transmitted using one specific pattern as a whole. Furthermore, in the case of eight antenna ports, the CSI-RS may be transmitted using two patterns. Contrarily, the muting is always made by one pattern unit. For example, although the muting may be applied to a plurality of patterns, when the muting region does not overlap the region of the CSI-RS, the muting cannot be applied to a part of one pattern. However, when the CSI-RS region does not overlap the muting region, the muting may be applied to a part of one pattern.

A reference signal should be transmitted in order to measure a downlink channel state in a cellular system. In the case of the LTE-A system of 3GPP, the user terminal measures a channel state between the base station and the user terminal using the CRS or the CSI-RS that are transmitted by the base station. The channel state should consider several factors including the amount of interference in downlink. The amount of interference in downlink includes interference signals and thermal noise generated by antennas included in a nearby base station, and it is important for the terminal to determine a channel state of downlink.

For example, when a signal is transmitted from a base station having a single transmission antenna to a user terminal having a single reception antenna, the user terminal should determine a signal to noise plus interference ratio (SNIR) by determining energy per symbol, which can be received through downlink, and the amount of interference that is to be simultaneously received in the section where the corresponding symbol is received, from a reference signal received from the base station. The SNIR is a value obtained by dividing power of a reception signal by the intensity of interference and noise signals. In general, the higher the SNIR is, the better reception performance and the higher data transmission speed can be obtained. The determined SNIR, a value corresponding thereto, or the maximum data transmission speed supported by the corresponding SNIR is notified to the base station so that the base station determines the data transmission speed from the base station to the user terminal through downlink.

In the case of a general mobile communication system, base station equipment is disposed at the intermediate region of each cell, and the corresponding base station equipment performs mobile communication with the user terminals using one or more antennas located in a limited place. The mobile communication system in which antennas included in one cell are disposed at the same place is called a centralized antenna system (CAS). On the contrary, the mobile communication system in which antennas (e.g., remote radio head (RRH)) included in one cell are disposed at distributed places is called a distributed antenna system (DAS).

FIG. 3 illustrates a deployment of antennas in a general distributed antenna system according to the related art.

Referring to FIG. 3, a distributed antenna system having two cells 300 and 310 is illustrated. The cell 300 has one high power antenna 320 and four low power antennas 340. The high power antenna 320 may provide services to the entire cell area. On the contrary, the low power antennas 340 may provide a high data speed-based service to limited user terminals in limited cell areas. In addition, the low power antennas 340 and the high power antenna 320 may be connected with a central controller as denoted by a reference numeral 330 to be operated according to scheduling and wireless resource allotment by the central controller. In the distributed antenna system, one or more antennas may be disposed at a single antenna region that is geographically separated. The antenna or the antennas which are disposed at the same region in the distributed antenna system is referred to as an antenna group (RRH group).

As shown in FIG. 3, in the distributed antenna system, the user terminal receives signals from a single antenna group that is geographically separated, whereas signals transmitted from the other antenna groups act as interference.

FIG. 4 illustrates generation of interference when each one of antenna groups transmits signals to different user terminals in a distributed antenna system according to the related art.

Referring to FIG. 4, a first user equipment (UE1) 400 receives a traffic signal from an antenna group 410. On the contrary, a second user equipment (UE2) 420, a third user equipment (UE3) 440, and a fourth user equipment (UE4) 460 receive traffic signals from an antenna group 430, an antenna group 450, and an antenna group 470, respectively. The UE1 400 receives a traffic signal from the antenna group 410 while other antenna groups 430, 450, and 470, which transmit traffic signals to other user equipment 420, 440, and 450, interfere with the UE1 400. For example, the signals transmitted from the antenna groups 430, 450, and 470 may give interference effect to the UE1 400.

In general, interference due to other antenna groups in the distributed antenna system may have two types as follows.

Inter-cell interference: Interference generated by antenna groups of other cells, and Intra-cell interference: Interference generated in antenna groups of the same cell.

In FIG. 4, interference generated by the antenna group 430 that is included in the same cell may be intra-cell interference with respect to the UE1 400. In addition, interference generated by the antenna groups 450 and 470 included in the nearby cell may be inter-cell interference with respect to the UE1 400. The inter-cell interference and the intra-cell interference are simultaneously received by the user terminal to thereby interrupt data channel reception thereof.

In general, the user terminal receives a wireless signal with noise and interference. For example, the reception signal may be expressed as Equation 1 below.

$$r = s + \text{noise} + \text{interfernce} \qquad \text{Equation 1}$$

In Equation 1, "r" is a reception signal, and "s" is a transmission signal. "noise" is noise that conforms to the Gaussian distribution, and "interference" is an interference signal generated in wireless communications. The interference signal may be generated in the following circumstances.

Interference by a nearby transmission location: the case in which signals transmitted from a nearby cell or a nearby antenna in the distributed antenna system interfere with a desired signal, and Interference in the same transmission location: the case in which signals for different users interfere with each other when performing MU-MIMO transmission using a plurality of antennas in a single transmission region.

The SNIR value may vary according to the interference, and consequently, this may influence reception performance. In general, interference is the greatest factor that hinders system performance in a cellular mobile communication system, and thus the system performance may be determined by the control of interference. The LTE/LTE-A systems have introduced various standard technologies to support coordinated multi-point transmission and reception (CoMP), which is cooperative communication, in order to control interference. In the CoMP, a network makes an overall and central control for transmission from a plurality of base stations or transmission points to thereby determine presence of interference and the intensity thereof in downlink and uplink. For example, in the case of two base stations, a central controller of a network may stop transmission of signals from the second base station in order to prevent interference with the user terminal that receives signals from the first base station.

Error correction encoding is performed in order to correct errors generated in transmitting and receiving signals in a wireless communication system. The LTE/LTE-A systems use convolution codes and turbo codes for the error correction encoding. In order to enhance decoding performance of the error correction encoding, receivers demodulate symbols modulated in quadrature phase shift keying (QPSK), 16 quadrature amplitude modulation (QAM), or 64QAM using not hard decision but soft decision. When "+1" or "−1" is transmitted from a transmission terminal, a receiver adopting the hard decision selects one of "+1" or "−1" from the reception signal and outputs the same. Contrarily, a receiver adopting the soft decision outputs information on whether "+1" or "4" is received in the reception signal together with reliability of the corresponding decision. Such reliability information may be utilized to enhance decoding performance in a decoding process.

An output value of the receiver that adopts the soft decision is generally calculated using a log likelihood ratio (LLR). When the transmission signal is applied with a binary PSK (BPSK) modulating method that is one of "+1" or "−1," the LLR may be defined as Equation 2 below.

$$LLR = \log \frac{f(r \mid s = +1)}{f(r \mid s = -1)}$$ Equation 2

In Equation 2, "r" is a reception signal, and "s" is a transmission signal. In addition, a conditional probability density function $f(r \mid s=+1)$ is the probability density function of a reception signal on a condition that a transmission signal of "+1" has been transmitted. Likewise, a conditional probability density function $f(r \mid s=-1)$ is the probability density function of a reception signal on a condition that a transmission signal of "−1" has been transmitted. In the case of the modulating methods of QPSK, 16QAM, and 64QAM, the LLR may be expressed as an equation in a similar manner. The conditional probability density function has the Gaussian distribution in the absence of interference.

FIG. 5 illustrates a conditional probability density function according to the related art.

Referring to FIG. 5, a reference numeral 500 denotes the conditional probability density function $f(r \mid s=-1)$, and a reference numeral 510 denotes the conditional probability density function $f(r \mid s=+1)$. For example, if a reception signal has a value indicated by a reference numeral 520, the receiver may calculate the LLR as log(f2/f1) using the conditional probability density function. The conditional probability density function of FIG. 5 corresponds to the case in which noise and interference conform to the Gaussian distribution.

In mobile communication systems, such as the LTE/ LTE-A systems, the base station can transmit information of more than dozens of bits to the user terminal by a one-time PDSCH transmission. At this time, the base station encodes information to be transmitted to the user terminal, and modulates the same in the manners, such as QPSK, 16QAM, 64QAM, or the like, to be thereby transmitted. Accordingly, the user terminal that has received the PDSCH creates the LLRs for dozens of encoding symbols and transfers the same to a decoder in the process of demodulating dozens of modulation symbols.

FIG. 6 illustrates a conditional probability density function on a condition that reception signals and interference signals are transmitted in a BPSK modulation method according to the related art.

Referring to FIG. 6, the noise generally conforms to the Gaussian distribution, whereas the interference may not conform to the Gaussian distribution in some cases. The main reason why the interference does not conform to the Gaussian distribution is that the interference is wireless signals for other receivers, differently from the noise. For example, in Equation 1, since "interference" is a wireless signal for another receiver, it is applied with modulation methods, such as BPSK, QPSK, 16QAM, 64QAM, or the like, to be thereby transmitted. For example, if an interference signal is modulated in "BPSK," the interference may have probability distribution having a value of "+k" or "−k" at the same probability. The "k" above is a value that is determined by the signal intensity attenuation effect of a wireless channel.

It is assumed that the noise conforms to the Gaussian distribution in FIG. 6. It can be seen that the conditional probability density function of FIG. 6 is different from the conditional probability density function of FIG. 5.

Referring to FIG. 6, a reference numeral 620 denotes the conditional probability density function $f(r \mid s=-1)$, and a reference numeral 630 denotes the conditional probability density function $f(r \mid s=+1)$. In addition, a value 610 is determined according to signal power of the interference signal and the influence of a wireless channel. For example, if a reception signal has a value indicated by a reference numeral 600, the receiver may calculate the LLR as log(f4/ f3) using the conditional probability density function. This value may be different from the LLR value of FIG. 5 because the conditional probability density function is different. For example, the LLR calculated based on a modulation method of the interference signal is different from the LLR calculated on the assumption that the interference conforms to the Gaussian distribution.

FIG. 7 illustrates a conditional probability density function on an assumption that reception signals are transmitted in a BPSK modulation method and interference signals are transmitted in a 16QAM modulation method according to the related art.

Referring to FIG. 7, the conditional probability density function may vary with the modulation method of interference. The reception signals are transmitted in the BPSK modulation method in FIGS. 6 and 7, but the interference signal in FIG. 6 is transmitted in the BPSK method, and the interference signal in FIG. 7 is transmitted in the 16QAM method. For example, even with the same modulation method of a reception signal, the conditional probability density function may vary with the modulation method of the interference signal. Consequently, the calculated LLRs may be different.

Referring to FIGS. 5, 6, and 7, the LLR may have different values depending on the assumption and calculation for the interference by the receiver. In order to optimize reception performance, the LLR should be calculated using a conditional probability density function reflecting statistical characteristics of actual interference, or the LLR should be calculated after the interference is removed in advance. For example, in the case of the interference being transmitted in the BPSK modulation method, the receiver should calculate the LLR on the assumption that the interference is transmitted in the BPSK modulation method, or after the interference modulated in the BPSK method is removed. In the case of the interference being transmitted in the BPSK modulation method, if the receiver just assumes that the interference has the Gaussian distribution or that the interference is transmitted in the 16QAM modulation method without being removed, the LLR may not be calculated to have an optimized value, so the reception performance cannot be enhanced.

Therefore, a need exists for a method and an apparatus for transferring interference-related control information in order to enhance reception performance of a user terminal that receives downlink signals in a cellular mobile communication system based on an LTE-A system.

The above information is presented as background information only to assist with an understanding of the present disclosure. No determination has been made, and no assertion is made, as to whether any of the above might be applicable as prior art with regard to the present disclosure.

SUMMARY

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Aspects of the present disclosure are to address at least the above-mentioned problems and/or disadvantages and to provide at least the advantages described below. Accordingly, an aspect of the present disclosure is to provide an apparatus and a method for transferring interference-related control information in order to improve reception performance of a user terminal that receives downlink signals in a cellular mobile communication system based on a long term evolution-advanced (LTE-A) system.

In accordance with an aspect of the present disclosure, a communication method of a user terminal is provided. The method includes receiving transmission parameters of interference, which include information on a resource by which interference data is not transmitted, performing blind detection using the information on a resource by which interference data is not transmitted, performing error correction encoding using the transmission parameters of the interference and the blind detection result, and decoding the received data.

In addition, the information on a resource by which interference data is not transmitted, may include information on a channel status information reference signal (CSI-RS) that is operated in an interference cell and information on a muting resource.

In addition, the information on a resource by which interference data is not transmitted, may include a bitmap that shows information on the region where the interference data is not transmitted.

In addition, in the receiving of the transmission parameters of the interference, the transmission parameters of the interference may be received through an upper layer signal.

In addition, the transmission parameters of the interference may include information on transmission rank values that are applicable to an interference signal and available precoding matrixes for the same.

In addition, the transmission parameters of the interference may include cell specific reference signal (CRS) information of an interference cell, network deployment information of an interference cell, a transmission mode (TM) of an interference data channel, and control channel transmission region information.

In addition, in the performing of the blind detection, the blind detection may be performed using the following equation, $$\{\hat{R}, \hat{P}, \hat{S}\} = \underset{\{R, P_R, S_n\}}{\mathrm{argmax}} \left( \frac{1}{N_{RE}} \sum_{k=1}^{N_{RE}} \left( -\frac{1}{\sigma^2} \left\| y_k - \hat{H}_k^I P_R s_{min}^{P_R} \right\|^2 \right) - \ln(\pi \sigma^2 |S_n|) \right) \quad \text{Equation 3}$$

Referring to Equation 3, $\hat{H}_k^I$ is a matrix value estimating a channel through which an interference signal is transmitted, R denotes transmission rank values applicable to the interference signal, $P_R$ denotes available precoding matrixes for the rank value of a corresponding R, $S_n$ denotes signal constellation for the modulation order n, $|S_n|$ denotes the number of elements in the signal constellation, and $s_{min}^{P_R}$ denotes a symbol that has the minimum Euclidean distance from a reception vector among the elements in the given signal constellation for a given rank value and a given precoding matrix, and denotes a group of $N_{RE}$ and resource element (RE) samples to be used for the blind detection.

In accordance with another aspect of the present disclosure, a communication method of a base station is provided. The method includes configuring an interference cell for a user terminal and configuring transmission parameters of the interference cell, which are to be transmitted to the user terminal, and transmitting the transmission parameters of the interference, which include information on a resource by which interference data is not transmitted.

In accordance with another aspect of the present disclosure, a user terminal of a mobile communication system is provided. The user terminal includes a communication unit configured to transmit and receive signals to and from a base station and a controller configured to receive transmission parameters of interference, which include information on a resource by which interference data is not transmitted, to perform blind detection using the information on a resource by which interference data is not transmitted, to perform error correction encoding using the transmission parameters of interference and the blind detection result, and to decode the received data.

In accordance with another aspect of the present disclosure, a base station of a mobile communication system is provided. The base station includes a communication unit configured to transmit and receive signals to and from a user terminal and a controller configured to configure an interference cell for the user terminal, to configure transmission parameters of the interference cell, which are to be transmitted to the user terminal, and to control to transmit the transmission parameters of the interference, which include information on a resource by which interference data is not transmitted.

According to an embodiment of the present disclosure, it is possible to improve reception performance of a user terminal that receives downlink signals in a cellular mobile communication system based on an LTE-A system. In addition, the user terminal receives interference-related control information from a base station to thereby enhance the reception performance of the user terminal. Therefore, the user terminal can eliminate interference and improve the reception performance of the user terminal.

In addition, according to an embodiment of the present disclosure, the user terminal can determine an RE sample for applying blind detection. Therefore, the user terminal can eliminate interference signals by performing blind detection.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Further, the detailed description of various embodiments of the present disclosure is made mainly based on a wireless communication system based on orthogonal frequency division multiplexing (OFDM), particularly the $3^{rd}$ Generation Partnership Project (3GPP) evolved universal terrestrial radio access (EUTRA) standard, but the subject matter of the present disclosure can be applied to other communication systems having a similar technical background and channel form after a little modification without departing from the scope of the present disclosure, and the above can be determined by those skilled in the art.

Figure 8:
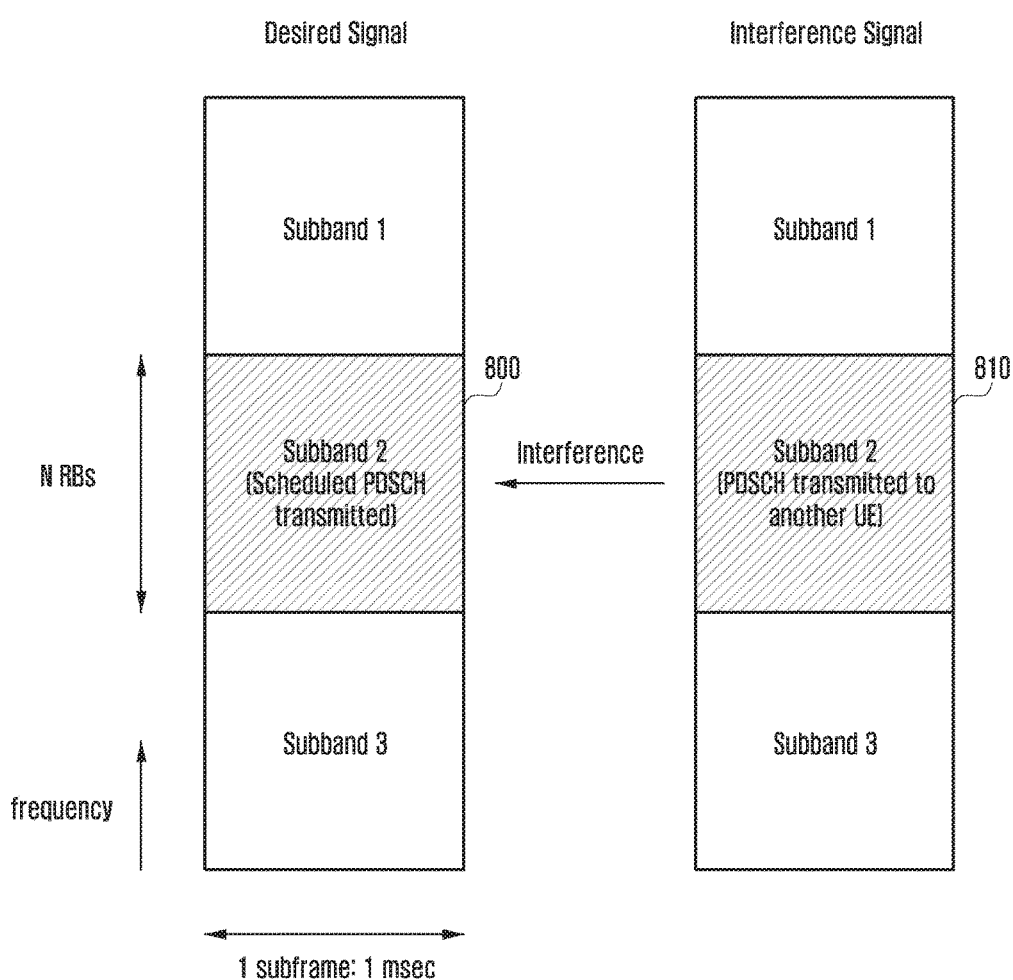
FIG. 8 illustrates generation of interference in LTE/LTE-A systems according to an embodiment of the present disclosure.

FIG. 8 illustrates generation of interference in long term evolution (LTE)/LTE-advanced (LTE-A) systems according to an embodiment of the present disclosure.

Referring to FIG. 8, a user terminal wishes to receive a wireless signal 800. At this time, an interference signal 810 transmitted to another user terminal interferes with the user terminal. Such interference is generated when the desired signal and the interference signal belong to the same frequency section of the same subframe in the LTE/LTE-A systems. The embodiment of FIG. 8 assumes that the desired signal and the interference signal are transmitted by N resource blocks (RBs).

In order to improve the reception performance in the process of detecting the desired signal in FIG. 8, the log likelihood ratio (LLR) should be calculated after the interference signal 810 is eliminated, or the LLR should be calculated after accurately calculating a conditional probability density function reflecting statistical characteristics of the interference signal 810. The user terminal should know the modulation method of the interference signal and reception power of the interference signal in order to remove the interference 810 or induce the conditional probability density function reflecting statistical characteristics of the interference signal. In the case of LTE/LTE-A systems, in order to identify the modulation method of the interference signal and the reception power of the interference signal, the user terminal should know at least one of the following transmission parameters.

Cell specific reference signal (CRS) information of interference cell
Cell identifier (cell ID)
Number of CRS antenna ports
Multicast/broadcast over single frequency network (MB-SFN) subframe information
Data resource element (RE) to CRS energy per RE (EPRE) ratio
$P_A$, $P_B$ as per 3GPP TS 36.213 section 5.2
Network development information of interference cell
Synchronization information between base stations
Cyclic prefix information
Subframe (or slot) number information Transmission mode (TM) of interference physical downlink shared channel (PDSCH)

PDSCH-related dynamic transmission information of interference

Physical downlink control channel (PDCCH) transmission region (or PDSCH start symbol index)

Modulation order

Rank indication: information on the number of transmission streams of interference PDSCH Precoding matrix indicator: precoding information of interference PDSCH Demodulation reference signal (DMRS) information (DMRSI)

DMRS antenna port information (DMRS-AP)

DMRS virtual cell ID (or scrambling ID)

In the LTE/LTE-A systems, available values for the transmission mode of the interference PDSCH among the transmission parameters about the interference are TM1 to TM10, and the PDSCH transmission method for each mode refers to 3GPP TS 36.213. Some of the transmission parameters about the interference may be transmitted from the base station to the user terminal through separate signaling, and others thereof may be directly detected by the user terminal using a blind detection method. In addition, when the base station provides a candidate group of available values for a specific transmission parameter to the user terminal, the user terminal may detect a corresponding transmission parameter value of the interference from among the provided available parameter values using the blind detection method. In the present specification, it is assumed that parameters corresponding to CRS information of an interference cell, network deployment information of an interference cell, and transmission mode information of the interference PDSCH, and PDCCH transmission region information have been provided from the base station to the user terminal through upper layer signaling, or that the user terminal has identified the same through blind detection in advance. In addition, the description will be made by considering that the user terminal performs blind detection for the modulation order/rank indicator (RI)/precoding matrix indicator (PMI) of an interference signal or the modulation order/DMRSI to eliminate the interference signal or to calculate a conditional probability density function reflecting statistical characteristics of an interference signal. However, the present disclosure is not limited thereto, and the modulation order/RI/PMI or the modulation order/DMRSI may be detected through joint blind detection together with some of the transmission parameters of other interference.

According to an embodiment of the present disclosure, it is assumed that the parameters corresponding to CRS information of an interference cell, and network deployment information of an interference cell, and PDCCH transmission region information have been provided from the base station to the user terminal through upper layer signaling, or that the user terminal has identified the same through blind detection in advance. In addition, if some of TM1 to TM6 which are operated based on the CRS are available for the interference PDSCH transmission mode, the user terminal may perform bind detection by which the modulation order/RI/PMI information of the interference is identified, in order to eliminate the interference signal or calculate a conditional probability density function reflecting statistical characteristics of the interference signal.

Meanwhile, in describing a method for performing blind detection for modulation order/RI/PMI of the interference signal by the user terminal, a reception signal of the user terminal may be expressed as Equation 4 as follows.

$$y_k = H_k^S x^S + H_k^I x^I + w \quad \text{Equation 4}$$

Referring to Equation 4, $H_k^S$ denotes a channel from a base station, with which a user terminal connects in the kth RE, to the user terminal, and $x^S$ denotes a transmission signal vector that is transmitted to the user terminal. In addition, $H_k^I$ is a channel through which the interference signal is transmitted in the kth RE, and $x^I$ and "w" denote an interference signal vector and the Gaussian noise having a distribution of $\sigma^2$, respectively.

The approximated maximum likelihood detection method, one of the methods for performing blind detection of the modulation order/RI/PMI with respect to the interference signal of the user terminal may be expressed as Equation 5 below.

$$\{\hat{R}, \hat{P}, \hat{S}\} = \quad \text{Equation 5}$$

$$\underset{\{R, P_R, S_n\}}{\operatorname{argmax}} \left( \frac{1}{N_{RE}} \sum_{k=1}^{N_{RE}} \left( -\frac{1}{\sigma^2} \left\| y_k - \hat{H}_k^I P_R s_{min}^{P_R} \right\|^2 \right) - \ln(\pi\sigma^2 |S_n|) \right)$$

In Equation 5, $\hat{H}_k^I$ is a matrix value estimating a channel through which the interference signal is transmitted, and it is estimated through the CRS for the interference cell. In addition, R denotes transmission rank values applicable to the interference signal, and $P_R$ denotes available precoding matrixes for the rank value of a corresponding R. Here, all of available rank values and precoding matrixes, which are defined with respect to the number of CRS antenna ports in the LTE/LTE-A systems, may be considered as the transmission rank values applicable to the interference signal and the available precoding matrixes for the same. Alternatively, a group of available rank values and precoding matrixes, which are transmitted in the form of a bitmap through an upper layer signal, may be considered as the transmission rank values applicable to the interference signal and the available precoding matrixes for the same. For example, in the case where M pieces of the CRS antenna ports are identified from the CRS information of an interference cell, the upper layer signal for a group of available transmission rank values and precoding matrixes may express usability of each of the precoding matrixes that are defined according to rank values 1 to M, as "1" or "0," and may transmit the bitmap for each rank value, which are successive in order of the rank value, to the user terminal. For example, in the case where the CRS of an interference cell for a specific user terminal has two CRS antenna ports, an upper layer signal expressed as bitmaps of 7 bits may be transmitted from the base station to the user terminal so that the corresponding user terminal identifies available rank values, i.e., 1 and 2, which are defined in the LTE/LTE-A systems, and usability of respective four and three available precoding matrixes corresponding thereto. On the contrary, in the case where a specific user terminal identifies two CRS antenna ports from the CRS information of an interference cell, if the user terminal does not receive a separate upper layer signal for the transmission rank values and the precoding matrixes, which are applicable to the interference signal, the approximate maximum likelihood (AML) detection method in which Equation 5 is used for available rank values, i.e., 1 and 2, which are defined for the 2-port CRS in the LTE/LTE-A systems, and four and three available precoding matrixes respectively defined for the same, may be applied.

In addition, in Equation 5, $S_n$ denotes signal constellation for the modulation order n. Here, n=2, 4, 6 (or 8) in the LTE/LTE-A systems, and quadrature phase shift keying (QPSK), 16 quadrature amplitude modulation (QAM), 64QAM (or 256QAM) are applied to the values, respectively. Furthermore, $|S_n|$ denotes the number of elements in the signal constellation, and may be calculated as $2^n$ for each n value. In addition, $S_{min}^{P_R}$ denotes a symbol that has the minimum Euclidean distance from a reception vector among the elements in the given signal constellation for a given rank value and a given precoding matrix, and it may be expressed as Equation 6 as follows.

$$s_{min}^{P_R} = \underset{s \in S_n}{\operatorname{argmin}} \|y_k - H_k^l P_R s\|^2 \quad \text{Equation 6}$$

Finally, when $N_{RE}$ in Equation 5 and a group of RE samples to be used for blind detection are determined, the user terminal may perform blind detection of the modulation order/RI/PMI through the AML method. At this time, the group of the RE samples to be used for blind detection of the modulation order/RI/PMI by the user terminal should be applied with the same modulation order/RI/PMI and should have the same power level. Therefore, the user terminal should perform blind detection using only the PDSCH REs except for the CRS, the DMRS, the PDSCH, the control channel, the CSI-RS, the muting, or the like in the basic unit of interference PDSCH scheduling. According to an embodiment of the present disclosure, the basic unit of interference PDSCH scheduling may be one RB or a group of RBs according to systems.

Hereinafter, a method for determining an RE sample for applying blind detection by the user terminal in the basic unit of interference PDSCH scheduling will be described.

Figure 1:
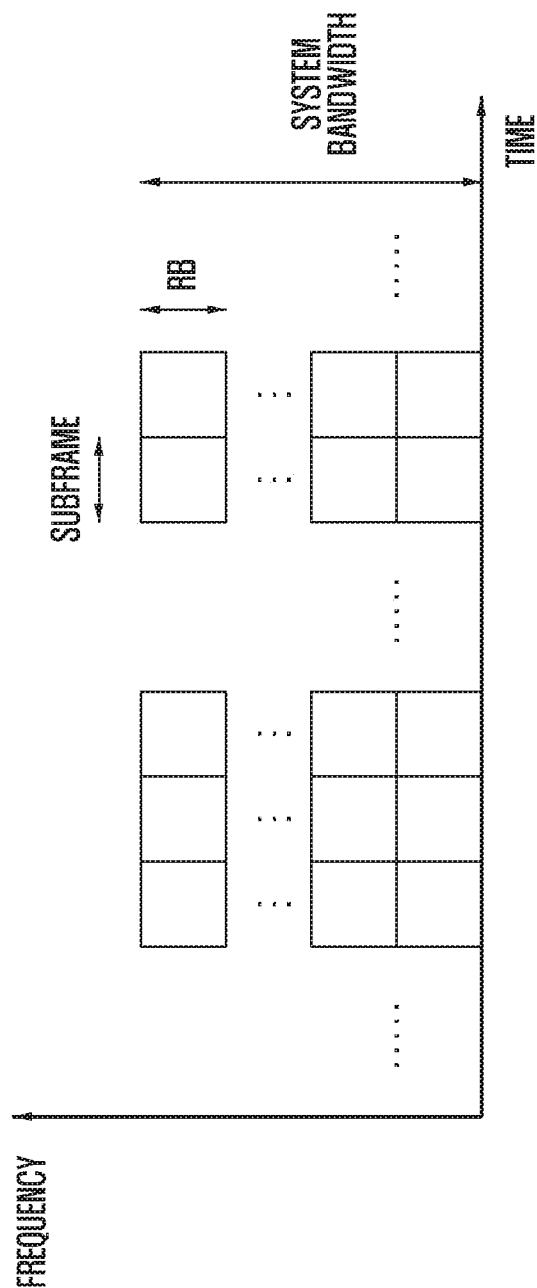
FIG. 1 illustrates time and frequency resources in long term evolution (LTE)/LTE-advanced (LTE-A) systems according to the related art.
Figure 2:
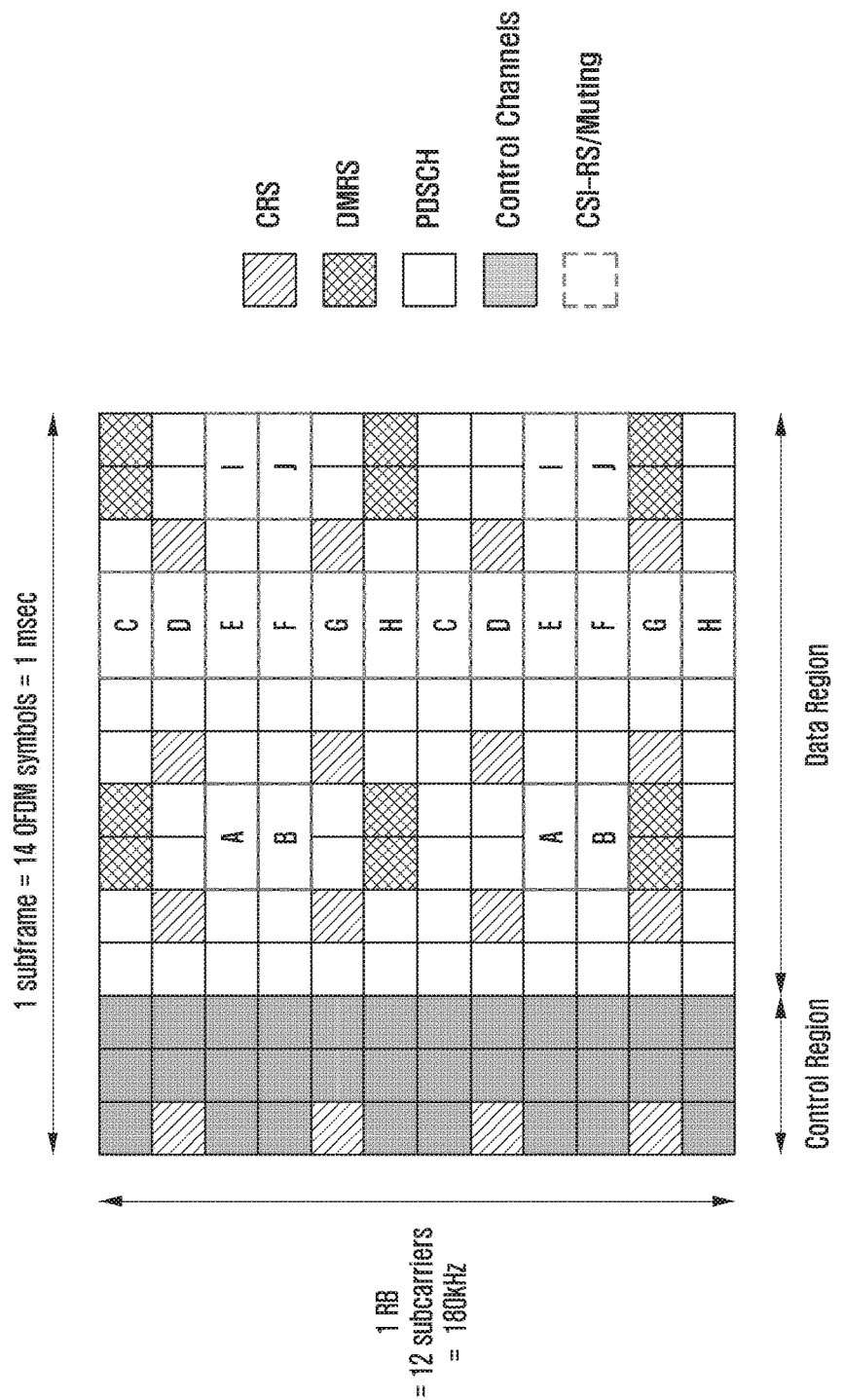
FIG. 2 illustrates a minimum wireless resource of one subframe and one resource block (RB) for scheduling through downlink in LTE/LTE-A systems according to the related art.
Figure 3:
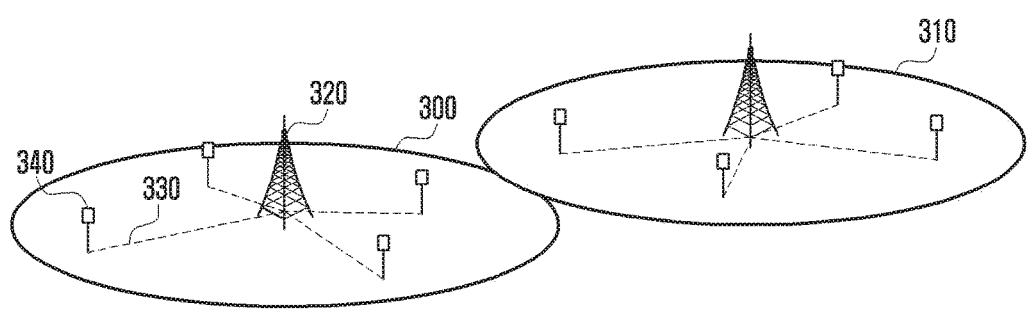
FIG. 3 illustrates a deployment of antennas in a general distributed antenna system according to the related art.
Figure 4:
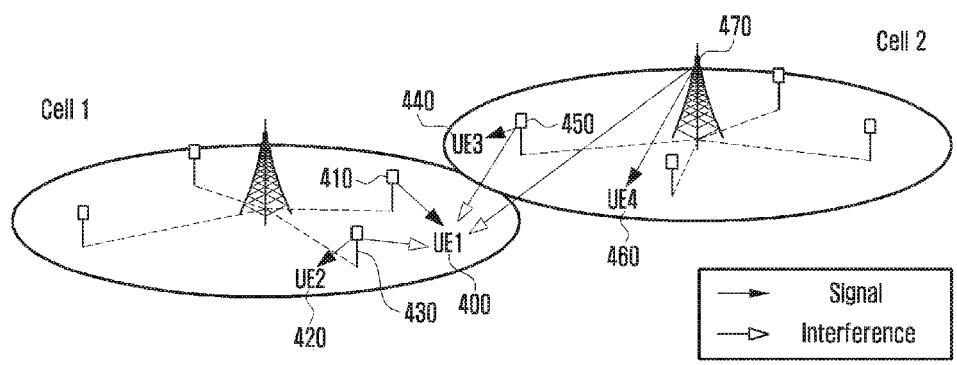
FIG. 4 illustrates generation of interference when each one of antenna groups transmits signals to different user terminals in a distributed antenna system according to the related art.
Figure 5:
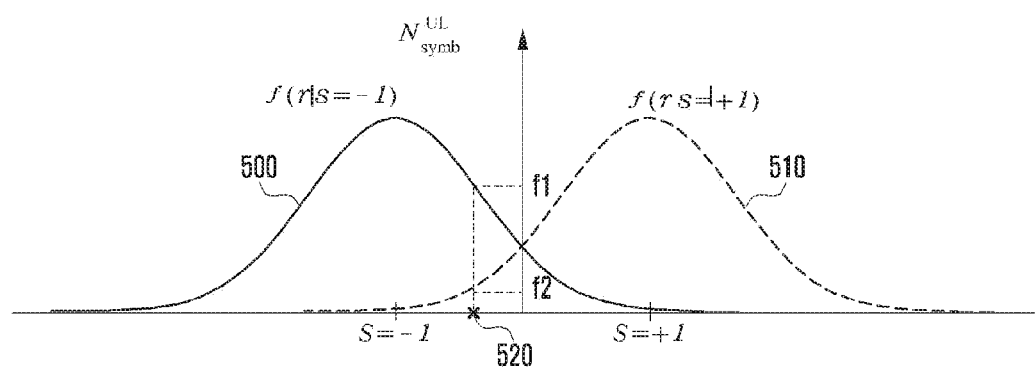
FIG. 5 illustrates a conditional probability density function according to the related art.
Figure 6:
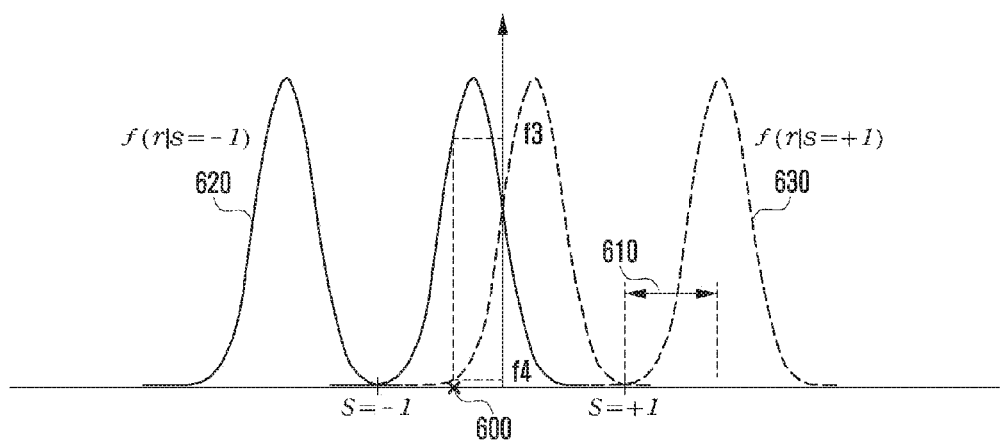
FIG. 6 illustrates a conditional probability density function on a condition that reception signals and interference signals are transmitted in a binary phase shift keying (BPSK) modulation method according to the related art.
Figure 7:
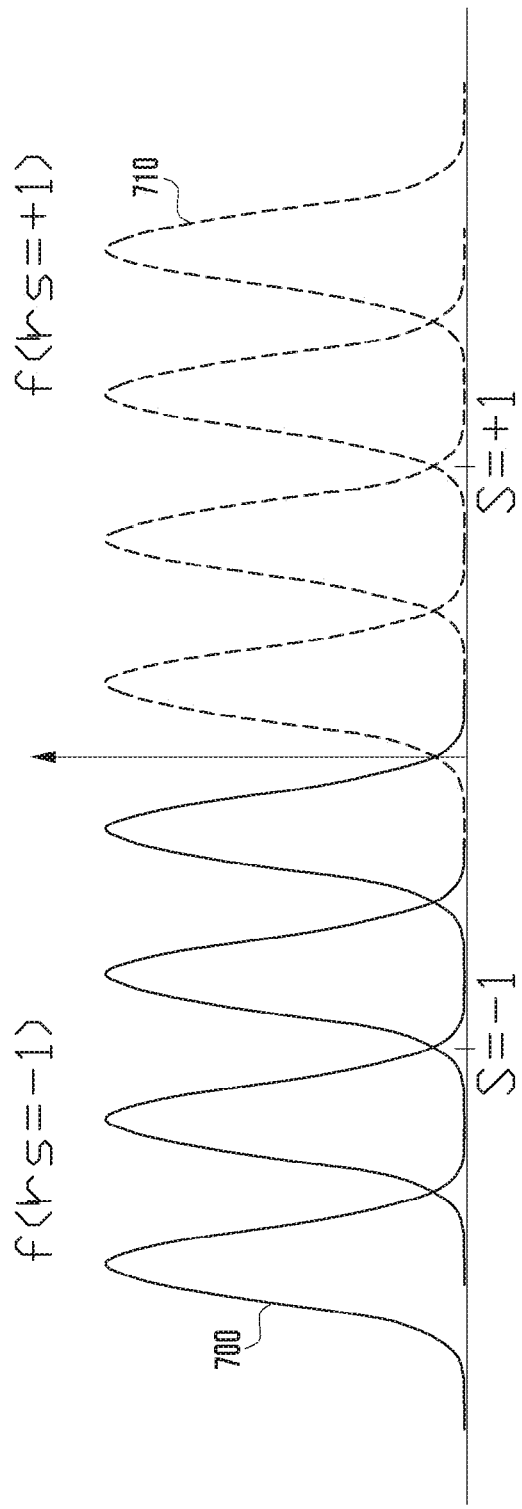
FIG. 7 illustrates a conditional probability density function on an assumption that reception signals are transmitted in a BPSK modulation method and interference signals are transmitted in a 16 quadrature amplitude modulation (QAM) modulation method according to the related art.

In the LTE/LTE-A systems, the region of DMRS in the RB is fixed with respect to the number of DMRS antenna ports, so the user terminal may recognize the presence of DMRS using the interference PDSCH information including TM information of the interference transmitted through the upper layer signal, or using the blind detection. In addition, when the DMRS exists, the user terminal may determine the samples of the REs for applying the blind detection of the modulation order/RI/PMI, avoiding the REs in which the DMRS exists. The DMRS region in the RB of LTE/LTE-A systems is shown in FIG. 2, and has been described above, so a description thereof will be omitted here.

In addition, the region of the control channel in a specific RB is determined to be three or four OFDM symbols that are transmitted in advance according to downlink bandwidth. Accordingly, for example, the user terminal may determine the RE samples for applying the blind detection of the modulation order/RI/PMI by simply considering the number of OFDMs of the maximum control channel, avoiding the corresponding REs.

In addition, since the CRS region is determined according to the cell ID of the interference cell, the number of CRS antenna ports, and MBSFN subframe information, the user terminal may identify the CRS region of the interference cell using the information above.

However, in the case of the CSI-RS notified to the user terminal through the upper layer signal that is transmitted to each user terminal in the corresponding cell, it is difficult for the cell to identify the number of CSI-RSs and the operating method of CSI-RSs, which are operated by the interference cell. In addition, since the muting corresponds to an RE region where no signals are transmitted in the interference cell, it is not easy for the user terminal to recognize the muting region of the interference cell. Accordingly, in order to determine the RE samples for applying blind detection of the modulation order/RI/PMI, avoiding the regions of the CSI-RS and the muting of the interference cell, the user terminal needs to be informed of the regions of the CSI-RS and the muting of the interference cell.

At this time, according to an embodiment of the present disclosure, the base station may separately inform the user terminal of the regions of the CSI-RS and the muting of the interference cell, respectively. Alternatively, as set forth in FIG. 2 and the related part, since the available muting region includes the available CSI-RS region, according to an embodiment of the present disclosure, the base station may transfer the REs in which the PDSCH of the interference is not transmitted by the CSI-RS or the muting of the interference cell to the user terminal, reusing the upper layer signal values for notifying of the muting.

In the first method by which the base station separately informs the user terminal of the CSI-RS region and the muting region of the interference cell, respectively, the user terminal may identify the following information and may determine the RE samples for applying bind detection of the modulation order/RI/PMI, avoiding the corresponding region.

CSI-RS and muting information of interference cell:
M pieces of CSI-RS information operated in interference cell:
CSI-RS [0~(M−1)]:
Number of antenna ports, transmission timing (cycle/offset), transmission region in RB, sequence information
N pieces of muting information operated in interference cell
Muting [0~(N−1)]:
Transmission timing (cycle/offset), bitmap indicating transmission region in RB According to an embodiment of the present disclosure, the muting information operated by the interference cell may be transferred to the user terminal as the information for informing of the REs that cannot be applied to the blind detection rather than muting information of the interference cell. More particularly, according to an embodiment of the present disclosure, the muting information of the interference cell may show a specific muting region that is comprised of 4 RE units of specific bits of a bitmap. Meanwhile, the base station may transmit the CSI-RS and muting information of the interference cell to the user terminal through the upper layer signal.

As described in the second method above, since the available muting region includes the available CSI-RS region, the REs in which the PDSCH of the interference is not transmitted by the CSI-RS or the muting of the interference cell, may be transferred to the user terminal reusing only typical upper layer signal values for notifying of the muting. For example, the base station may transfer the following upper layer signal with respect to the REs, in which the PDSCH of the interference is not transmitted, to the user terminal. In addition, the user terminal may identify the corresponding upper layer signal and may determine the RE samples for applying the blind detection of the modulation order/RI/PMI, avoiding the corresponding region.

RE region information in which the interference PDSCH is not transmitted:
Muting [0~(L−1)]:

Transmission timing (cycle/offset), bitmap indicating transmission region in RB

According to an embodiment of the present disclosure, the RE region information in which the interference PDSCH is not transmitted, may have the same form as the muting information of the LTE-A system, and may show that the PDSCH of the interference is not transmitted at a specific region that is comprised of 4 RE units of specific bits of a bitmap.

Until now, the method for determining RE samples for applying the blind detection in the basic unit of the interference PDSCH scheduling by the user terminal was described.

Now, the user terminal may determine a group of the RE samples to be used for the blind detection using the available CRS region, the DMRS region, the control channel region, and the RB regions except for the REs in which the interference PDSCH, such as additional CSI-RSs and the muting, is not transmitted, and may perform the blind detection of the modulation order/RI/PMI.

As described above, the user terminal performs blind detection of the modulation order/RI/PMI based on the AML blind detection method. However, the present disclosure is not limited to the AML blind detection method, and the method for determining RE samples for blind detection and the method for identifying the RI and the precoding matrix may be applied to another type of blind detection.

Afterwards, the user terminal that has performed the blind detection for the modulation order/RI/PMI identifies all of the transmission parameters for the interference. Thus, in the process of detecting the desired signal by the user terminal as shown in FIG. 8, the user terminal may eliminate the interference signal, and then may calculate the LLR. Alternatively, the user terminal may accurately calculate the conditional probability density function reflecting statistical characteristics of the interference signal to thereby improve the reception performance.

Hereinafter, a method for improving reception performance through removal and suppression of interference by the user terminal will be described.

Figure 9:
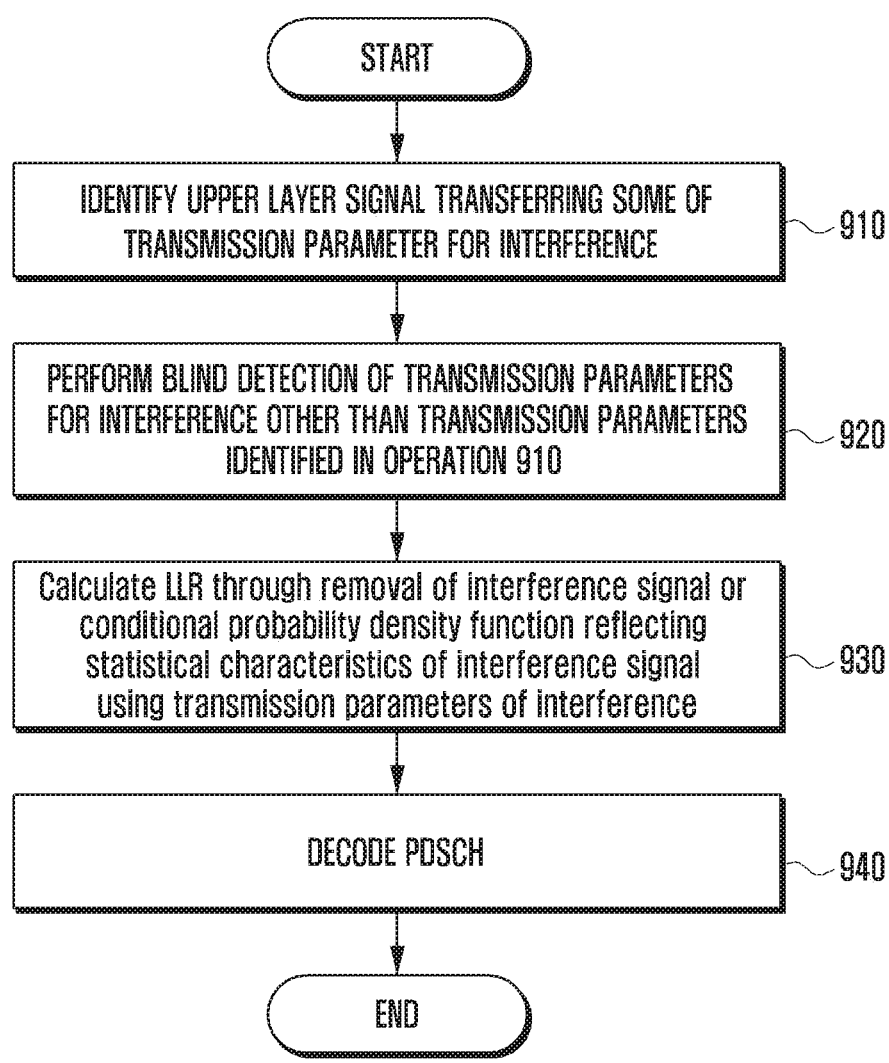
FIG. 9 is a flowchart illustrating an operation of a user terminal according to an embodiment of the present disclosure.

FIG. 9 is a flowchart illustrating an operation of a user terminal according to an embodiment of the present disclosure.

Referring to FIG. 9, in operation 910, a user terminal may receive an upper layer signal that transfers some of the transmission parameters about the interference. In addition, the user terminal may identify the transmission parameters included in the received upper layer signal, and may begin the process of removing and suppressing the interference. According to an embodiment of the present disclosure, the upper layer signal for the transmission parameters may include information on the transmission rank values that are applicable to the interference signal and available precoding matrixes corresponding to the same, as set forth above. Furthermore, according to an embodiment of the present disclosure, the upper layer signal for the transmission parameters may include the RE region information in which the interference PDSCH is not transmitted, as described above.

Thereafter, in operation 920, the user terminal may perform blind detection of the RI/PMI in a group of available rank values and precoding matrixes using the transmission parameters identified in operation 910, and additionally, may perform blind detection for the modulation method. According to an embodiment of the present disclosure, the blind detection of the modulation method/RI/PMI may be performed jointly or in sequence. In addition, the samples of the REs to be used for the blind detection may be determined using the RE region information in which the interference PDSCH is not transmitted, as mentioned above.

In operation 930, the user terminal may calculate LLR through removal of the interference signal or the conditional probability density function reflecting statistical characteristics of the interference signal, using the transmission parameters about the interference, which include the result of the blind detection for the modulation method/RI/PMI.

Subsequently, in operation 940, the user terminal may perform PDSCH decoding using the calculated LLR.

Figure 10:
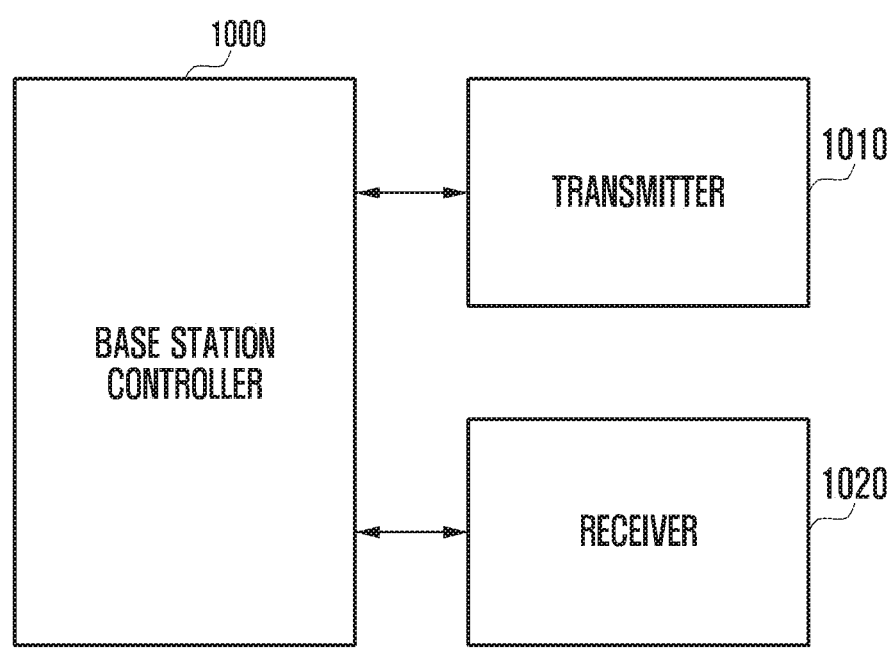
FIG. 10 is a block diagram of a base station according to an embodiment of the present disclosure.

FIG. 10 is a block diagram of a base station according to an embodiment of the present disclosure.

Referring to FIG. 10, a base station, according to an embodiment of the present disclosure, may include a communication unit (e.g., a transmitter 1010 and a receiver 1020), and a base station controller 1000 that controls overall operations of the base station.

The base station controller 1000 controls the base station to perform one of the operations as set forth above. For example, the base station controller 1000 may perform configuration of the interference cell with respect to a specific user terminal, configuration of the transmission parameters of the interference cell, which are to be transmitted to the user terminal, and determination of PDSCH scheduling and corresponding CSI-RS and CRS information. Here, the transmission parameters of the interference cell may include information on rank values and precoding matrixes, and RE information that cannot be used for the blind detection.

In addition, the transmitter 1010 and the receiver 1020 of the base station transmits and receives signals, respectively, according to one of the operations set forth above. At this time, a communication unit may include the transmitter 1010 and the receiver 1020. For example, the transmission parameters of the interference cell of the user terminal, which have been determined by the base station controller 1000, may be notified of to the user terminal using the transmitter 1010. In addition, the control information and the PDSCH may be transmitted by the transmitter 1010 to the user terminal according to the determination of PDSCH scheduling by the base station. Furthermore, the base station may receive channel state information for the transmission of the PDSCH and PDSCH scheduling of the user terminal using the receiver 1020.

Figure 11:
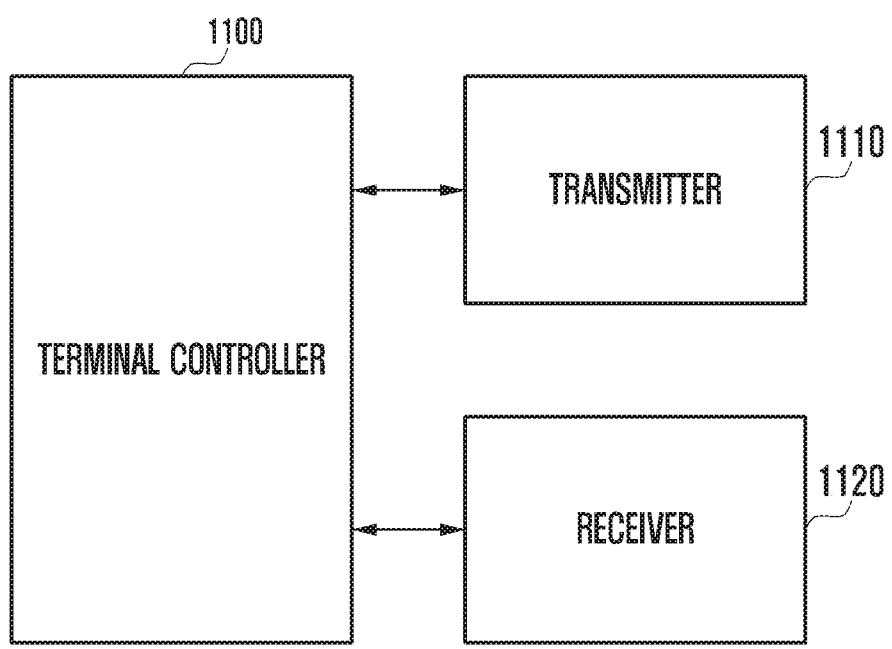
FIG. 11 is a block diagram of a user terminal according to an embodiment of the present disclosure.

FIG. 11 is a block diagram of a user terminal according to an embodiment of the present disclosure.

Referring to FIG. 11, a user terminal, according to an embodiment of the present disclosure, may include a communication unit (e.g., a transmitter 1110 and a receiver 1120), and a user terminal controller 1100 that controls overall operations of the user terminal.

The user terminal controller 1100 controls the user terminal to perform one of the operations as set forth above. For example, the user terminal controller 1100 may make a control to receive control information for configuring the transmission parameters of the interference cell from the base station using the receiver 1020. In addition, the user terminal controller 1100 may measure an interference channel using a specific wireless resource, and may determine whether or not to perform blind detection. Furthermore, the user terminal controller 1100 may determine an available group, such as RI and precoding matrix information for blind detection to thereby perform the blind detection, and may perform decoding through removal and suppression of the interference.

In addition, the transmitter 1110 and the receiver 1120 of the user terminal transmits and receives signals, respectively, according to one of the operations set forth above. At this time, a communication unit may include the transmitter 1110 and the receiver 1120. For example, the receiver may receive control information for configuring the transmission parameters of the interference cell from the base station so that the user terminal controller 1100 determines scheduling information of the PDSCH based on the received control information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a user terminal, the method comprising:
   receiving, from a serving base station, at least one first interference parameters associated with a neighbor base station;
   receiving, from the serving base station, information on a candidate group of available values for at least one second interference parameters associated with the neighbor base station;
   performing blind detection of the at least one second interference parameters based on the information on the candidate group;
   receiving, from the serving base station, downlink data; and
   decoding the downlink data based on the at least one first interference parameters and the at least one second interference parameters.

2. The method of claim 1, wherein the decoding of the downlink data comprises performing error correction encoding based on the at least one first interference parameters and the at least one second interference parameters.

3. The method of claim 1, further comprising:
   calculating a conditional probability density function reflecting statistical characteristics of an interference signal based on the at least one first interference parameters and the at least one second interference parameters.

4. The method of claim 1, wherein the at least one first interference parameters include at least one of a cell identifier of the neighbor cell, a number of cell specific reference signal (CRS) antenna ports of the neighbor cell and multicast/broadcast over single frequency network (MBSFN) subframe information on the neighbor cell.

5. The method of claim 1, wherein the at least one second interference parameters include a transmission mode of the neighbor cell.

6. A communication method of a base station, the method comprising:
   transmitting, to a user terminal, at least one first interference parameters associated with a neighbor base station;
   transmitting, to the user terminal, information on a candidate group of available values for at least one second interference parameters associated with the neighbor base station; and
   transmitting, to the user terminal, downlink data,
   wherein the at least one second interference parameters are detected by the user terminal among the available values using blind detection, and
   wherein the downlink data is decoded by the user terminal based on the at least one first interference parameters and the at least one second interference parameters.

7. The method of claim 6, wherein the at least one first interference parameters include at least one of a cell identifier of the neighbor cell, a number of cell specific reference signal (CRS) antenna ports of the neighbor cell and multicast/broadcast over single frequency network (MBSFN) subframe information on the neighbor cell.

8. The method of claim 6, wherein the at least one second interference parameters include a transmission mode of the neighbor cell.

9. A user terminal of a mobile communication system, the user terminal comprising:
   a transmitter configured to transmit signals to a serving base station;
   a receiver configured to receive signals from the serving base station; and
   a controller configured to:
      control the receiver to receive, from the serving base station, at least one first interference parameters associated with a neighbor base station,
      control the receiver to receive, from the serving base station, information on a candidate group of available values for at least one second interference parameters associated with the neighbor base station,
      perform blind detection of the at least one second interference parameters based on the information on the candidate group,
      control the receiver to receive, from the serving base station, downlink data, and
      decode the downlink data based on the at least one first interference parameters and the at least one second interference parameters.

10. The user terminal of claim 9, wherein the controller is further configured to perform error correction encoding based on the at least one first interference parameters and the at least one second interference parameters.

11. The user terminal of claim 9, wherein the controller is further configured to calculate a conditional probability density function reflecting statistical characteristics of an interference signal based on the at least one first interference parameters and the at least one second interference parameters.

12. The user terminal of claim 9, wherein the at least one first interference parameters include at least one of a cell identifier of the neighbor cell, a number of cell specific reference signal (CRS) antenna ports of the neighbor cell and multicast/broadcast over single frequency network (MBSFN) subframe information on the neighbor cell.

13. The user terminal of claim 9, wherein the at least one second interference parameters include a transmission mode of the neighbor cell.

14. A base station of a mobile communication system, the base station comprising:
   a transmitter configured to transmit signals to a user terminal;
   a receiver configured to receive signals from the user terminal; and
   a controller configured to:
      control the transmitter to transmit, to the user terminal, at least one first interference parameters associated with a neighbor base station,
      control the transmitter to transmit, to the user terminal, information on a candidate group of available values for at least one second interference parameters associated with the neighbor base station, and control the transmitter to transmit, to the user terminal, downlink data, wherein the at least one second interference parameters are detected by the user terminal among the available values using blind detection, and wherein the downlink data is decoded by the user terminal based on the at least one first interference parameters and the at least one second interference parameters.

15. The base station of claim 14, wherein the at least one first interference parameters include at least one of a cell identifier of the neighbor cell, a number of cell specific reference signal (CRS) antenna ports of the neighbor cell and multicast/broadcast over single frequency network (MBSFN) subframe information on the neighbor cell.

16. The base station of claim 14, wherein the at least one second interference parameters include a transmission mode of the neighbor cell.

* * * * *